United States Patent [19]

Hort

[11] 3,875,185
[45] Apr. 1, 1975

[54] PROCESS FOR THE PRODUCTION OF 2-HYDROXYETHYLPYRROLIDONE

[75] Inventor: Eugene Victor Hort, Piscataway, N.J.

[73] Assignee: GAF Corporation, New York, N.Y.

[22] Filed: July 27, 1972

[21] Appl. No.: 275,550

[52] U.S. Cl. .................................... 260/326.5 FL
[51] Int. Cl. ........................................... C07d 27/08
[58] Field of Search ........................... 260/326.5 FL

[56] References Cited
UNITED STATES PATENTS
2,775,599   12/1956   Puetzer et al. .................... 260/326.5

Primary Examiner—Joseph A. Narcavage
Attorney, Agent, or Firm—Walter C. Kehm; Samson B. Leavitt; Joshua J. Ward

[57] ABSTRACT

2-Hydroxyethylpyrrolidone is produced in high yields and enhanced purity by heating the reaction mixture of butyrolactone, 2-aminoethanol and intermediate product N-(hydroxyethyl)-4-hydroxybutyramide to about 180°–240°C, preferably about 190°–220°C, to remove water from said intermediate product. The water vapor thus removed is withdrawn from the reaction mixture and passed through a partial condensation zone adapted to condense butyrolactone and 2-aminoethanol vapors withdrawn therewith. The condensed reactants are returned to the reaction mixture. The loss of the butyrolactone and 2-aminoethanol due to dissociation of the intermediate product at elevated temperature is thereby obviated, and the yield of the desired 2-hydroxyethylpyrrolidone product is enhanced. The product can conveniently be separated from the reaction mixture residue, as by vacuum distillation, for recovery thereof in an essentially pure form.

6 Claims, No Drawings 3,875,185

PROCESS FOR THE PRODUCTION OF 2-HYDROXYETHYLPYRROLIDONE

BACKGROUND OF THE INVENTION

1. Field of the Invention

This invention relates to the production of 2-hydroxyethylpyrrolidone. More particularly, it relates to an improved process for the production of 2-hydroxyethylpyrrolidone with enhanced yields and purity.

2. Description of the Prior Art

The subject 2-hydroxyethylpyrrolidone is an amidoalcohol product possessing desirable solvent properties combined with low toxicity characteristics. In one prior art procedure for its preparation, 2-aminoethanol and butyrolactone were heated together in an autoclave, and the resulting solution was distilled. Equimolar proportions of butyrolactone and aminoethanol, for example, were heated to 250°C in an autoclave and distilled at reduced pressure. In an alternative embodiment of this approach, the autoclave reaction was carried out in two steps, with the reaction mixture heated to 100°C to produce N-(hydroxyethyl)-4-hydroxybutyramide, which was then dehydrated by heating to 250°C. The product 2-hydroxyethylpyrrolidone obtained by this general approach was of very poor quality, and was obtained in yields of on the order of 75%.

In another prior art approach, butyrolactone was heated with a 23% excess of aminoethanol at 180°-190°C to gradually distill out the water and excess aminoethanol. Distillation of the reaction residue resulted in a yield of about 88% of poor grade 2-hydroxyethylpyrrolidone.

Convenient methods of preparation of 2-hydroxyethylpyrrolidone, therefore, have resulted in disappointing yields of relatively poor grade product. Efforts to produce a purer product have heretofore necessarily involved more costly preparation or purification techniques adversely effecting the economic feasibility of employing 2-hydroxyethylpyrrolidone for solvent applications and other uses where its desirable properties and very low toxicity would render it of particular advantage. As a result, the subject 2-hydroxyethylpyrrolidone has not been commercially available as an economically competitive product despite its advantageous solvent properties and other features.

It is an object of the present invention, therefore, to provide an improved process for the production of 2-hydroxyethylpyrrolidone.

It is another object of the invention to provide a process for the production of a high quality 2-hydroxyethylpyrrolidone.

It is another object of the invention to provide a process for the production of an essentially pure 2-hydroxyethylpyrrolidone in high yields.

With these and other objects in mind, the invention is hereinafter set forth in detail, the novel features thereof being particularly pointed out in the appended claims.

SUMMARY OF THE INVENTION

Butyrolactone and 2-aminoethanol are mixed, with an excess of said aminoethanol, and heated to a temperature of from about 180°C to about 240°C to dehydrate the resulting intermediate product, N-(hydroxyethyl)-4-hydroxybutyramide, the water driven off being removed from the reaction mixture and the accompanying butyrolactone and 2-aminoethanol produced by dissociation of the intermediate material being returned to the reaction mixture. For this purpose, the vapors removed from the reaction mixture are passed through a partial condensation zone adapted to condense butyrolactone and 2-aminoethanol vapors without condensation of the water vapor to be separated from the system. The condensed reactants are returned to the reaction mixture. Under such conditions, the intermediate N-(hydroxyethyl)-4-hydroxybutyramide cyclizes to form the product 2-hydroxyethylpyrrolidone in high yields. Upon separation from the reaction mixture residue, as by vacuum distillation, the product is obtained in essentially pure form.

DETAILED DESCRIPTION OF THE INVENTION

The process of the present invention enables 2-hydroxyethylpyrrolidone to be conveniently produced and recovered in enhanced yields as a purer product than could otherwise be economically produced. By the effective removal of water of dehydration from the reaction mixture in a vapor stream, the desired 2-hydroxyethylpyrrolidone can be produced and recovered without loss due to dissociation of the intermediate N-(hydroxyethyl)-4-hydroxybutyramide back to butyrolactone and 2-aminoethanol. The vapors of said butyrolactone and 2-aminoethanol that are present in the water vapor stream removed from the reaction mixture are recovered by passing said vapor stream through a partial condensation zone. Condensed reactants recovered in the partial condensation zone are returned to the reaction mixture, thus enhancing the overall yield of the desired product. Water vapor, however, is not condensed in the partial condensation zone, but is passed therefrom as a vapor thus removed from the reaction system. By dehydrating the intermediate product in this manner, the desired 2-hydroxyethylpyrrolidone is produced in high yields as an easily recoverable product in essentially pure form.

In the practice of the present invention, butyrolactone and 2-aminoethanol are mixed so as to react and form N-(hydroxyethyl)-2-hydroxybutyramide. The reaction is advantageously carried out with an excess of said aminoethanol. Thus the mole ratio of 2-aminoethanol to butyrolactone will generally be from about 1.2:1 to about 3:1, respectively, with a mole ratio of from about 1.5:1 to about 2.5:1 being preferred. As the excess of aminoethanol is increased beyond a mole ratio of 3:1, it has been found that such further increase does not tend to result in further significant additional yields of the desired product, that it reduces the amount of product that can be produced in a given reaction volume, and that it tends to result in an increase in the amount of 2-aminoethanol converted to nonvolatile residue.

When butyrolactone and 2-aminoethanol are mixed, they react fairly rapidly and exothermically to form the intermediate N-(hydroxyethyl)-4-hydroxybutyramide. A peak temperature of about 130°C is often reached in such reaction. Although said intermediate is very high boiling, it dissociates back to butyrolactone and 2-aminoethanol at elevated temperatures sufficiently so that it distills slowly at pot temperatures as low as about 130°C, at pressures of about 5–10 Torr. The distillate thus obtained can recombine exothermically in the receiver and, upon standing, the "distilled" N-(hydroxyethyl)-4-hydroxybutyramide can crystallize.

In the process of the present invention, however, the reaction mixture of butyrolactone, 2-aminoethanol and intermediate N-(hydroxyethyl)-4-hydroxybutyramide is heated to above about 180°C, e.g. to a temperature within the range of from about 180°C to about 240°C. The intermediate material thereupon loses water, i.e., is dehydrated, and cyclizes to form the desired product 2-hydroxyethylpyrrolidone. Loss of reactants due to dissociation of the intermediate material is avoided by the practice of the present invention, enhancing the yield of the desired product, which can thereupon be separated and recovered from the reaction mixture residue, as by vacuum distillation. A high quality, essentially pure 2-hydroxyethylpyrrolidone is thereby obtained in high yields.

During the heating of the reaction mixture as indicated above to remove water from the intermediate product, a vapor stream containing the removed water is withdrawn from the reaction mixture. This vapor stream will also contain the portion of the reactant materials, namely butyrolactone and 2-aminoethanol, that are vaporized during the heating of the reaction mixture. In accordance with the process of present invention, the withdrawn vapor stream is passed into a partial condensation zone in which the vapor stream is cooled under such conditions as to condense the butyrolactone and 2-aminoethanol vapors contained therein without condensation of the water vapor portion of said vapor stream. The overhead or partial condenser temperature will thus generally be at least about 100°C, with the partial condenser conveniently being steam heated. In certain embodiments of the invention, it may be desirable to operate under pressure where the temperature of the partial condenser will necessarily be higher than 100°C, e.g., at a pressure of 2 atmospheres (absolute) the partial condenser would have to be operated at approximately 121°C or slightly higher. The condensed material can be returned or recycled to the reaction mixture vessel, conveniently under gentle reflux conditions, for the production of additional amounts of the indicated intermediate and subsequent dehydration thereof to produce the desired product 2-hydroxyethylpyrrolidone. The uncondensed water vapor portion of the withdrawn vapor stream is withdrawn from the partial condensation zone and, of course, is not recycled to the reaction zone in the 2-hydroxyethylpyrrolidone operation as carried out within the scope of the present invention.

A high yield of 2-hydroxyethylpyrrolidone can thus be achieved in the practice of the present invention under convenient conditions conducive to the economic production of the desired product. When the invention is carried out at atmospheric pressure, the reaction temperature is generally limited to about 190°C by the desired refluxing of the excess aminoethanol. In order to carry out the reaction process at a higher temperature, thus shortening the reaction time, the reaction can be run under pressure at temperatures, as indicated above, of up to about 240°C. Operation at higher temperatures, e.g., at 260°C or above, was found to diminish the advantages of the invention, resulting in a relatively poor yield of lower quality material. In general, it has been found that the most favorable overall balance of desirable operating conditions, efficiency of yield and quality of product can be achieved by carrying out the present invention at a reaction temperature generally within the range of from about 190°C to about 220°C. It will be appreciated, however, that operating at a temperature of from about 180°C up to about 190°C also produces highly desirable results but, of course, with a longer time to achieve yields of at least about 90% and higher as are obtainable in the practice of the invention.

The 2-hydroxyethylpyrrolidone prepared as herein provided can readily be separated from the reaction mixture residue and purified, as by a suitable vacuum distillation operation. In such distillation at reduced pressure, excess aminoethanol employed can be recovered overhead as a distillation forerun, and the 2-hydroxyethylpyrrolidone can then be obtained as a virtually colorless, high purity product in high yields as hereinabove indicated.

2-Hydroxyethylpyrrolidone is known in the art as possessing desirable solvent characteristics, as for the extraction of aromatics from a mixture of aromatics and aliphatics. As produced in accordance with the process of the present invention as a high quality product, 2-hydroxyethylpyrrolidone is found to be remarkably effective for such separation of aromatics from aliphatics. This superior performance, coupled with the economical nature of the process of the invention for its production, serves to make the subject 2-hydroxyethylpyrrolidone a highly significant, commercially desirable solvent.

The invention is hereinafter described in further detail in the illustrative examples that follow, it being understood that said examples are intended solely for the purposes of illustrating the present invention and are not to be construed as constituting a limitation thereon. Unless otherwise indicated, the portions indicated in the examples are to be construed as parts by weight.

EXAMPLE 1

In a 5-liter flask fitted with a thermometer, sealed-in stirrer, and a steam-heated partial condenser leading to a water-cooled receiver, 2,928 grams (48 moles) of 2-aminoethanol and 2,064 grams (24 moles) of butyrolactone were charged. The exothermic reaction thereof spontaneously brought the pot temperature to 120°C. The reaction mixture solution was heated to a temperature such that a gentle reflux was maintained in the partial condenser. The following conditions were obtained as set forth in Table I below:

Table I

| Time, Hrs. | Pot Temp., °C | Overhead Temp., °C | Distillate Collected Grams |
|---|---|---|---|
| 11 | 178 | 105 | 224 |
| 23 | 185 | 105 | 386 |
| 35 | 189 | 101 | 471 |
| 42 | 190 | 100 | 489 |

The distillate collected analyzed as water containing 4% aminoethanol. The reaction flask was thereafter fitted with a 24-inch Vigreaux column, and the reaction mixture present in the flask was distilled at reduced pressure, i.e., under vacuum. After recovery of the excess aminoethanol present in the reaction mixture and a small intermediate cut, a 94% yield, based on butyrolactone, of pure, virtually colorless 2-hydroxyethylpyrrolidone was obtained, this desired product boiling at 138°C–140°C and 0.5 Torr.

EXAMPLE 2

The production and purification of 2-hydroxyethylpyrrolidone was carried out precisely as in Example 1 except that the aminoethanol used was the forerun from previous runs. The yield of essentially pure, colorless 2-hydroxyethylpyrrolidone was 94% in addition to another 3% in transitional cuts, giving a total yield of 97% based upon butyrolactone. On the basis of the aminoethanol consumed, the yield was 90.5%.

EXAMPLES 3–9

The effect of excess 2-aminoethanol was evaluated in a series of runs designated herein as Examples 3–9, carried out as indicated in Example 1 above except for the indicated variation in the amount of excess aminoethanol employed. The results obtained are as set forth in Table II below:

Table II

| Example | Mole Ratio of 2-Aminoethanol to Butyrolactone | Yield, % Based on Butyrolactone | Grams, Non-Volatile Residue per Gram of Product |
|---|---|---|---|
| 3 | 0.95 | 75 | 0.25 |
| 4 | 1.05 | 78 | 0.25 |
| 5 | 1.20 | 81 | 0.20 |
| 6 | 1.50 | 90 | 0.12 |
| 7 | 2.00 | 95 | 0.07 |
| 8 | 2.50 | 95 | 0.09 |
| 9 | 3.00 | 95 | 0.12 |

As can be seen by the results of said Examples 3–9, an excess of 2-aminoethanol in the reaction mixture is beneficial, with the mole ratio of 2-aminoethanol to butyrolactone being preferably in the range of from about 1.5:1 to about 2.5:1. In addition to the improved yields obtained with increasing excess of aminoethanol, both the color and odor of the distilled product was found to be improved with such increase in the excess of aminoethanol employed.

EXAMPLE 10

2-Hydroxyethylpyrrolidone was prepared as in Example 1, except that a stainless steel reactor was employed under an operating pressure sufficient to maintain the pot refluxing at 210°–215°C. The yield and quality of the desired product were substantially unchanged as compared with the results of said Example 1, but the reaction time required was reduced to only 5 hours.

The process of the present invention, therefore, permits the desired and highly desirable 2-hydroxyethylpyrrolidone product to be obtained in high yields as an essentially pure product. As the process of the present invention is also a commercially feasible process for the production of the subject 2-hydroxyethylpyrrolidone, the present invention permits said 2-hydroxyethylpyrrolidone to be produced with desired purity at an overall cost such that this product can be made available in the art competitively with other known solvent materials. As the subject 2-hydroxyethylpyrrolidone has outstanding solvent characteristics, the present invention thus represents a highly significant and desirable advance in the field of solvent preparation, making available a highly desirable solvent material not heretofore available on a competitive basis for use in commercially significant solvent extraction processes.

Therefore, I claim:

1. An improved process for the production of 2-hydroxyethylpyrrolidone comprising:
    a. mixing butyrolactone and an excess of 2-aminoethanol to form N-(hydroxyethyl)-4-hydroxybutyramide;
    b. heating the resulting reaction mixture of butyrolactone, 2-aminoethanol and said N-(hydroxyethyl)-4-hydroxybutyramide to a temperature in the range of from about 180°C to about 240°C, thereby dehydrating said N-(hydroxyethyl)-4-hydroxybutyramide, which thereupon cyclizes to form 2-hydroxyethylpyrrolidone;
    c. withdrawing a vapor stream comprising water vapor, butyrolactone and 2-aminoethanol from said reaction mixture during said heating of the reaction mixture;
    d. cooling said vapor stream in a partial condensation zone maintained at a temperature such as to condense butyrolactone and 2-aminoethanol vapors without condensation of said water vapor;
    e. withdrawing said uncondensed water vapor from the partial condensation zone; and
    f. recycling condensed butyrolactone and 2-aminoethanol to said reaction mixture.

2. The process of claim 1 in which the mole ratio of 2-aminoethanol to butyrolactone is in the range of from about 1.2:1 to about 3:1, respectively.

3. The process of claim 2 in which said mole ratio is from about 1.5:1 to about 2.5:1.

4. The process of claim 3 in which said reaction mixture is heated to from about 190°C to about 220°C.

5. The process of claim 1 and including separating said 2-hydroxyethylpyrrolidone from the reaction mixture residue to recover a high quality 2-hydroxyethylpyrrolidone product.

6. The process of claim 5 in which said 2-hydroxyethylpyrrolidone is separated from the reaction mixture residue by vacuum distillation.

* * * * *